US007788392B2

(12) United States Patent
Maynard et al.

(10) Patent No.: US 7,788,392 B2
(45) Date of Patent: Aug. 31, 2010

(54) MECHANISM FOR UNIVERSAL MEDIA REDIRECTION CONTROL

(75) Inventors: William Maynard, San Diego, CA (US); Abhijit Khobare, San Diego, CA (US); Joannes van de Groenendaal, Portland, CA (US); David Hines, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 751 days.

(21) Appl. No.: 11/480,745

(22) Filed: Jun. 30, 2006

(65) Prior Publication Data

US 2008/0021978 A1 Jan. 24, 2008

(51) Int. Cl.
*G06F 15/16* (2006.01)

(52) U.S. Cl. ........................................ 709/230; 709/238

(58) Field of Classification Search ................. 709/230, 709/238

See application file for complete search history.

(56) References Cited

U.S. PATENT DOCUMENTS 6,378,009 B1 * 4/2002 Pinkston et al. ............... 710/62
2003/0088633 A1 * 5/2003 Chiu et al. .................. 709/206
2007/0061477 A1 * 3/2007 Stoyanov et al. ............ 709/230

OTHER PUBLICATIONS

U.S. Appl. No. 11/173,006, filed Jun. 30, 2005, Govindarajan et al.

* cited by examiner

*Primary Examiner*—Dustin Nguyen
*Assistant Examiner*—Joel Mesa
(74) *Attorney, Agent, or Firm*—Schwabe, Williamson & Wyatt, P.C.

(57) ABSTRACT

Methods, apparatuses, articles, and systems for instantiating a control service to facilitate management of a remotely disposed platform supporting a plurality of redirection protocols of media devices of different types for redirecting the media devices, are described herein. In various embodiments, the control service is adapted to establish a control session with the remotely disposed platform and discover the supported redirection protocols of the media devices. In some embodiments, the control service is further adapted to control the remotely disposed platform based on the redirection protocols, to cause the remotely disposed platform to establish a data session with a media server, remotely disposed from the platform, having one or more of the media devices of different types, the data session including a number of redirection connections redirecting the media devices of the media server to the platform. Additionally, in one embodiment, the control service is adapted to manage the platform.

25 Claims, 4 Drawing Sheets

MECHANISM FOR UNIVERSAL MEDIA REDIRECTION CONTROL

TECHNICAL FIELD

Embodiments of the present invention relate to the fields of data processing and data communication, in particular, to methods and apparatuses for redirecting media devices to a remotely disposed platform through a control service of a control console.

BACKGROUND

Continuous advancements in networking and third-party, remote device management, represented by technologies such as Intel's Active Management Technology, have given rise to the possibility of networking a managed platform to media devices remote to that platform, making the media devices appear local to the platform. The ability to make a remote device appear local to a managed platform allows information technology (IT) professionals to accomplish such tasks as remote diagnostic boots and remote control of the managed platform using a redirected keyboard. To appear local to a remote, managed platform, media devices often employ redirection protocols that facilitate the two-way transmission of data between the remote platform and the devices. Each device typically has its own proprietary protocol for controlling its redirection (i.e., a Compact Disc-Read Only Memory (CD-ROM) may have one redirection protocol, a Universal Serial Bus (USB) biometric scanner may have another). Further, each proprietary redirection protocol typically has its own custom console for use by IT professionals to control redirection. Thus, under the prior art, it is difficult to remotely manage a platform using a plurality of redirected media devices.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include, but are not limited to, methods and apparatuses for instantiating a control service to facilitate management of a remotely disposed platform supporting a plurality of redirection protocols of media devices of different types for redirecting the media devices to the platform. In various embodiments, the control service is adapted to establish a control session with the remotely disposed platform and discover the supported redirection protocols of the media devices. In some embodiments, the control service is further adapted to control the remotely disposed platform to cause the remotely disposed platform to establish a data session with a media server, remotely disposed from the platform, having one or more of the media devices of different types, the data session including a number of redirection connections redirecting the media devices of the media server to the platform. Additionally, in one embodiment, the control service is adapted to manage the platform, including facilitating data input from and/or outputting data to the media devices through the established redirection connections of the data session.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
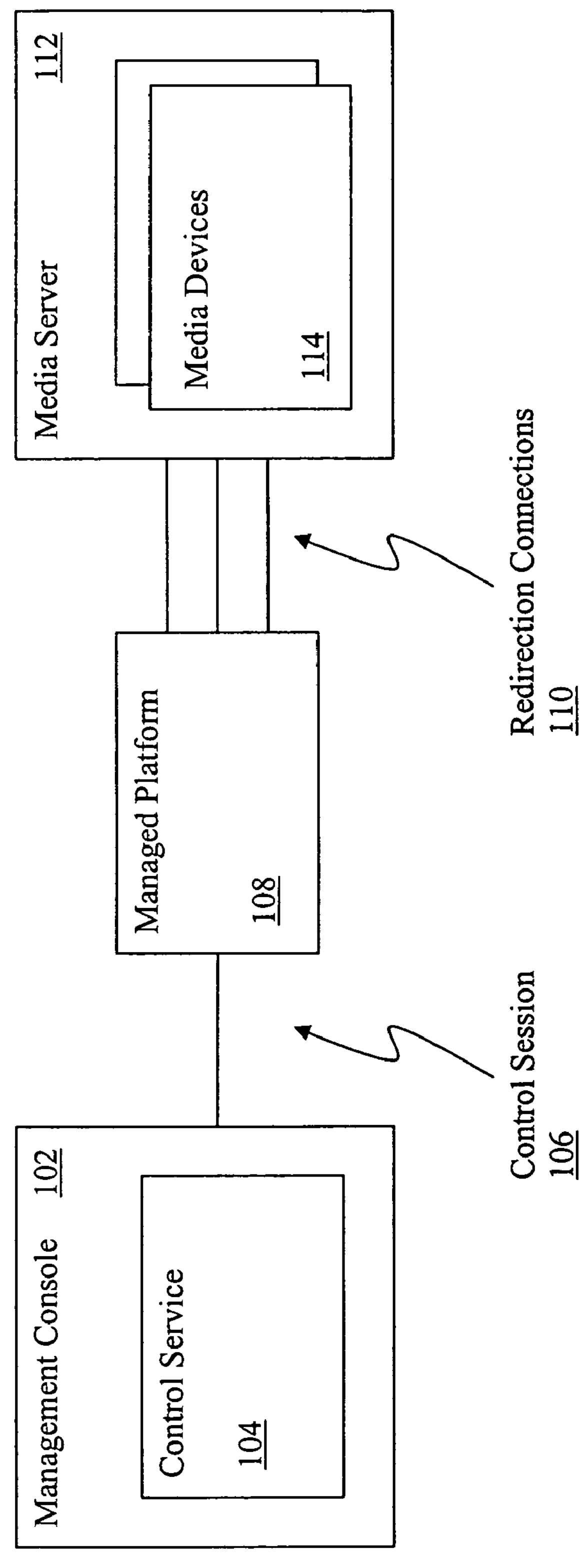
FIG. 1 illustrates an overview of various embodiments of the present invention, redirecting media devices to a remotely disposed platform through a common control console.

FIG. 1 illustrates an overview of various embodiments of the present invention, redirecting media devices to a remotely disposed platform through the use of a control service. As illustrated, for the embodiments, management console 102 comprises a control service 104 and is coupled to a managed platform 108, which in turn is coupled to a media server 112 having a plurality of media devices 114 of different media types. As will be described in more detail below, the control service 104, incorporated with the teachings of the present invention, is adapted to establish a control session 106 between the management console 102 and the managed platform 108, to enable discovery by control service 104 of redirection protocols supported by the managed platform 108. In various embodiments, control service 104 is further adapted to cause establishment of a data session between the managed platform 108 and the media server 112, the data session including a number of redirection connections 110 coupling/redirecting the media devices 114 of the media server 112 to the platform 108. In still other embodiments, control service 104 is adapted to enable a user to manage the managed platform 108, through the data session. The redirection connections 110, in some embodiments, may be provided for each media device 114 having a redirection protocol supported by the managed platform 108. While embodiments of the invention are described as including a plurality of media devices 114 of different media types, and a plurality of redirection connections 110, the invention may be practiced with one media device or a plurality of media devices of one or more media types, and one redirection connection or a plurality of redirection connections.

In some embodiments, the managed platform 108 is remotely disposed from the management console 102 and may be coupled to the management console 102 via one or more networking fabrics (not shown). The control service 104 is adapted to discover redirection protocols supported by the managed platform 108. The managed platform 108 may also be remotely disposed from the media server 112 and may be coupled to the media server 112 via one or more networking fabrics (not shown), which may or may not be the same networking fabrics coupling the management console 102 and the managed platform 108. The various embodiments are coupled to each other as shown.

Figure 4:
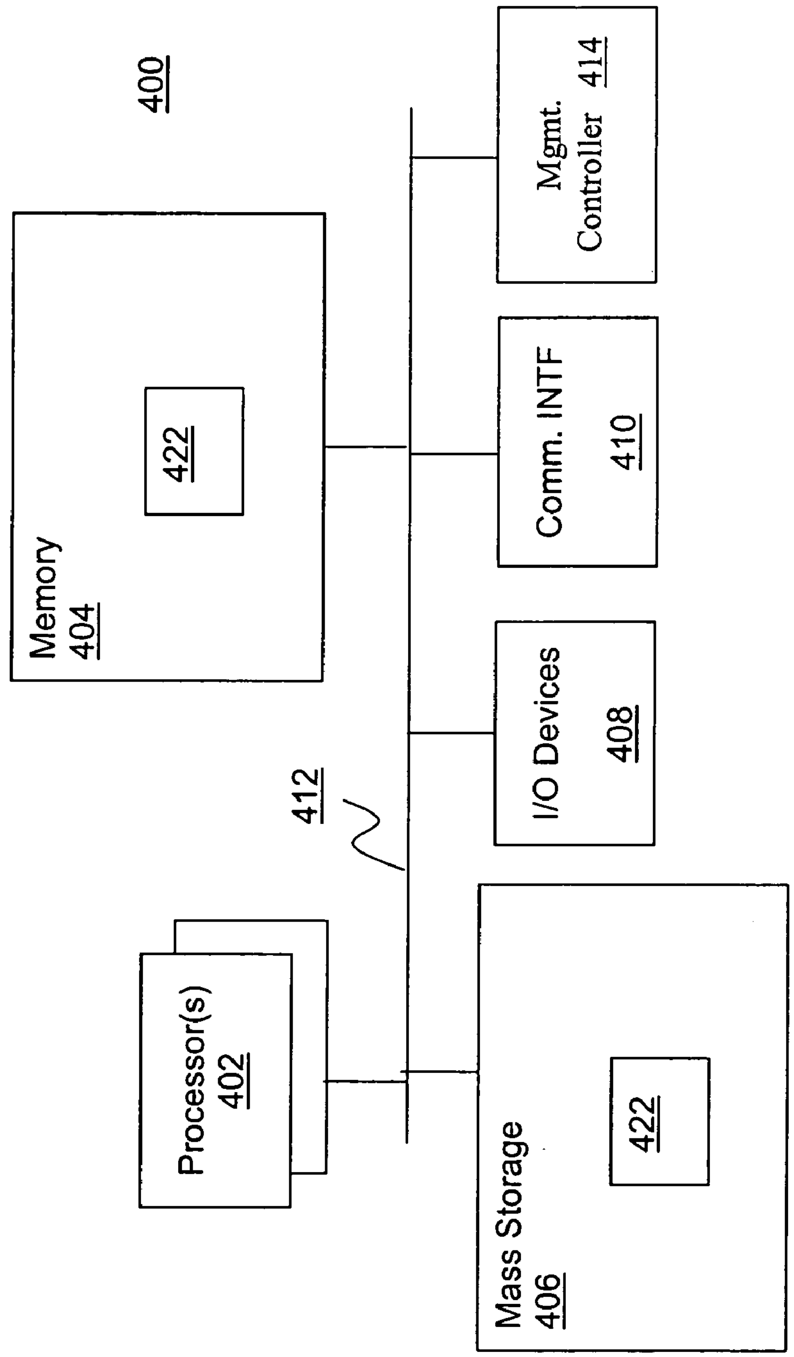
FIG. 4 illustrates an example computer system suitable for use to practice various embodiments of the present invention.

In various embodiments, management console 102, except for control service 104, may be any single- or multi-processor computing system known in the art. Management console 102 may be a personal computer (PC), a workstation, a server, a router, a mainframe, a personal digital assistant (PDA), an entertainment center, a set-top box, or a mobile device. An exemplary single-/multi-processor capable of performing the operations of a management console 102 is illustrated by FIG. 4, and is described in greater detail below. In various embodiments, management console 102 may be a computing system used by an IT professional at least for monitoring and managing remotely disposed computing systems of an enterprise. To facilitate the IT professional in monitoring and managing remote computing systems, the management console may provide the IT professional with a management interface (not shown). The management interface may be any sort of interface known in the art, such as a graphic user interfaces associated with the control service 104, a browser window, some other graphic user interface, or a command line interface. In some embodiments, a user of the management interface, such as an IT professional, may use the management interface to instantiate the control service 104, and may use the management interface to operate the control service 104, the details of the control service 104 operations discussed in greater detail below.

In one embodiment, the management console 102 may further be coupled to a plurality of media devices (not shown). These devices may include any sort of media devices known in the art, and in some embodiments may be the same sort of media devices as media devices 114 (described in greater detail below). In other embodiments, the management console 102 and the media server 112 may be the same physical device, and the media devices 114 of the media server 112 may also be the media devices of the management console 102.

The control service 104, may, in some embodiments, be capable of establishing a control session 106 with a managed platform 108, capable of discovering redirection protocols supported by the managed platform 108, capable of controlling managed platform 108 to initiate a data session between the platform 108 and a media server 112, including redirection connections 110 between media devices 114 of the server 112 and the platform 108, and capable of managing the platform 108. In other embodiments, rather than being an executable software process, the control service 104 may be implemented in hardware of the management console 102. In still other embodiments, control service 104 may be implemented in part in hardware, and in part, in software.

In some embodiments, a user of the management console 102 may instantiate the control service 104 through a management user interface. In other embodiments, the control service 104 may be automatically instantiated by the management console 102, either in response to some user defined, pre-determined trigger, or in response to a program. In other embodiments, the control service 104 is instantiated at startup, and may respond to management console 102 requests to perform other operations, may respond to other programs of the management console 102, and may respond to managed platform 108 requests for control sessions 106. By instantiating the control service 104 at startup, embodiments of the invention allow either the management console 102 or the managed platform 108 to request that the control service 104 establish a control session 106.

As illustrated, whether at the request of the management console 102 or the managed platform 108, the control service 104 may initiate a control session 106 between the management console 102 and the managed platform 108, where the control service 104 of the management console 102 and a redirection control service of the managed platform 108 may be the endpoints of the control session 106. The redirection control service of the managed platform 108 may be instantiated on the managed platform 108 at the request of the control service 104, or may be a persistent process. The redirection control service may also be implemented in an embedded management controller of the managed platform 108, enabling the redirection to be transparent to the operating system of the managed platform 108. Further, the redirection control service may be specified by one or more Common Information Model (CIM) classes that may be present on the managed platform 108 or downloaded from the management console 102 at the direction of the control service 104. Once instantiated, the control service 104 and the redirection control service may communicate across a networking fabric using remote procedure calls and other networking communication mechanisms known in the art. The communications may comprise data and function calls, and may utilize CIM to define a common data format understood by both the control service 104 and the redirection control service. In first establishing the control session 106, management console 102 and managed platform 108 may use a transport/Internet protocol such as the Transmission Control Protocol/Internet Protocol (TCP/IP) to achieve a TCP/IP connection, or may rely on Asynchronous Transfer Mode (ATM) virtual connections to establish the session 106. In some embodiments, the protocols used and connections achieved may depend upon the networking fabric. Once established, the control session 106 may facilitate the control service 104 in discovering the redirection protocols supported by the managed platform 108 and in controlling and managing the managed platform 108.

The networking fabric coupling the management console 102 and the managed platform 108 may be of any sort of local area network, wide area network, or the Internet. Depending on the networking interface possessed by each of the management console 102 and the managed platform 108, the connections of the networking fabric, for example, may be achieved by one or more of Ethernet, Bluetooth, and/or WiFi technologies. The connection formed may also be of any sort, such as a TCP/IP connection or an ATM virtual connection. In one embodiment, a bus may be used in place of a traditional networking fabric to transport packets between remotely disposed computing devices. Such a bus may be a serial interface.

Managed platform 108, except for the manner it is managed, may also be any single- or multi-processor computing system known in the art, like the management console 102. In one embodiment, the managed platform 108 is a multi-processor computing system with at least a first and a second processor, an operating system operated by the first processor, and a management controller operated by the second processor. In such an embodiment, one or more of the processes, sub-processes, or modules supporting the redirection protocols and/or responding to the control service 104 may be executed by the management controller, independent of and transparent to the operating system. Further, managed platform 108 may be a personal computer (PC), a workstation, a server, a router, a mainframe, a personal digital assistant (PDA), an entertainment center, a set-top box, or a mobile device. An exemplary single-/multi-processor capable of performing the operations of a managed platform 108 is illustrated by FIG. 4, and is described in greater detail below. The managed platform 108 may further support one or more redirection protocols for remote media devices, such as media devices 114. The redirection protocols of the media devices 114 may allow the media devices 114 to be redirected from media server 112, to a remote computing system, such as managed platform 108. In some embodiments, managed platform 108 may only support redirection protocols of remote media devices 114 if comparable media devices are locally coupled to the managed platform 108. In other embodiments, managed platform 108 need not be locally coupled to a media device to support its redirection protocol. In yet other embodiments, managed platform 108 may download instructions implementing one or more redirection protocols from management console 102, media server 112, and/or some other computing device, in whole or in part, enabling the managed platform 108 to support the protocols. Additionally, the managed platform 108 may possess one or more resources and/or capabilities related to the support of the protocols, such as the speed of a particular device port, such as a USB port, or the bandwidth of the managed platform 108.

Once a control session 106 has been established by the control service 104 between the control service 104 of the management console 102 and the redirection control service of the managed platform 108, the control service 104 may discover the redirection protocols supported by the managed platform 108 and the associated capabilities of the managed platform 108. In one embodiment, the discovery may simply take the form of a query of the control service 104 to the redirection control service, the redirection control service being capable of determining the protocols and capabilities supported, and of informing the control service 104 in response to the query.

Further referring to FIG. 1, the managed platform 108 may be remotely disposed from the media server 112, and may be coupled to the server 112 via a networking fabric (not shown). The networking fabric may be of any sort of local area network, wide area network, or the Internet, or in one embodiment, described above, may be a bus serving in place of a networking fabric to couple computer systems. Depending on the networking interface possessed by each of the media server 112 and the managed platform 108, the connections of the networking fabric, for example, may be achieved by one or more of Ethernet, Bluetooth, and/or WiFi technologies. The connection formed may also be of any sort known in the art, such as a TCP/IP connection or an ATM virtual connection. In various embodiments, the networking fabric connecting the management console 102 to the managed platform 108 may be the same networking fabric connecting the managed platform 108 to the media server 112. Managed platform 108 may connect to both networking fabrics (or one, if the same fabric) via the same networking interface. In other embodiments, the two networking fabrics may be different. In yet other embodiments, the managed platform 108 may include a plurality of networking interfaces for connecting to a plurality of networking fabrics.

Media server 112, except for the manner it cooperates with management console 102, may be any single- or multi-processor computing system known in the art, like the management console 102 or managed platform 108. Media server 112 may be a personal computer (PC), a workstation, a server, a router, a mainframe, a personal digital assistant (PDA), an entertainment center, a set-top box, or a mobile device. An exemplary single-/multi-processor capable of performing the operations of a media server 112 is illustrated by FIG. 4, and is described in greater detail below. The media server 112 may be locally coupled to a plurality of media devices, such as media devices 114, and may include one or more processes/modules capable of engaging in a data session with a redirection control service of a remotely disposed managed platform 108 and of supporting a plurality of redirection connections 110 of the data session between the managed platform 108 and one or more of the media devices 114. In some embodiments, media server 112 may be the same computing system as management console 102.

In various embodiments, the media devices 114 may be any sort of media device known in the art having a redirection protocol for redirecting data of the media device from the computing system locally coupled to the media device to a remotely disposed computing system. Exemplary media devices 114 may include CD-ROMs, biometric scanners, serial ports, scanners, KVM (keyboards, video controllers, and mice, which are redirected as a set), floppy disk drives, and mass storage devices but may include any media device. The redirection protocol of each device 114 may specify a manner of data communication between the media device 114 and a remotely disposed platform 108. In various embodiments, the redirection protocol may be a vendor-produced redirection protocol included by the vendor of the media device 114 to facilitate the redirection of the device 114. The vendor-produced redirection protocol may even include a device-specific redirection interface. Each redirection protocol of each device 114 may have a plurality of mechanisms to facilitate redirection, and the mechanisms of each protocol may vary from protocol to protocol and device to device. The various media devices 114, in some embodiments, are devices of different types. Each device 114 may be locally coupled to the media server 112 through a port, plug, or connector of the media server 112, depending on the connector of the device 114. For example, a biometric scanner may have a USB connector capable of being received by a USB plug of the media server 112.

Upon discovering the redirection protocols supported by the managed platform 108, the control service 104 may control the managed platform 108, establishing a data session between the redirection control service of the managed platform 108 and the media server 112. The redirection control service of the managed platform 108 may receive a command from the control service 104 directing the process/module to establish a data session, including redirection connections with media devices 114 of the server 112, and the command may include an identification of the media server 112 as an endpoint for the data session. In response, the redirection control service may request a data session with the media server 112. Upon establishing the data session, the redirection control service of the managed platform 108, at the direction of the control service 104, may establish a plurality of redirection connections 110 with media devices 114 of the server 112 through mechanisms of the redirection protocols. In other embodiments, the media server 112, rather than the redirection control service, may establish the redirection connections 110. Whether the redirection control service or the media server 112 initiates a redirection connection 110 may depend on transport and/or security requirements of the redirection protocol of the redirection connection 110. Further, the number of redirection connections 110 established, and the devices 114 that connections 110 are established with may vary depending upon the purposes of the redirection connection 110. For example, if an IT professional utilizing the control service 104 and having access to the media devices 114 of the media server 112 desires to perform a remote diagnostic boot on the managed platform 108 and to view display data of the managed platform 108, the IT professional may utilize the control service 104 to direct the managed platform 108 to establish redirection connections 110 with a CD-ROM device 114 and a display device 114 of the media server 112 (assuming that the platform 108 supports redirection protocols of both devices 114). Through the redirection connections 110, the devices 114 may appear local to the managed platform 108, and may function as if they were locally coupled to the platform 108, achieving remote management of the platform 108, and/or some other purpose (for example, if media device 114 is a biometric scanner, the redirection may achieve authentication of a remote user).

In various embodiments, the control service 104 may also direct the redirection control service of managed platform 108 to define the security and transport mechanisms for each redirection connection 110. The security and transport mechanisms may be any security and transport mechanisms known in the art, such as Transport Layer Security (TLS) over TCP/IP, may be a function of the redirection protocol each redirection connection 110 is based upon, and may thus vary from redirection connection 110 to redirection connection 110.

Further referring to FIG. 1, once the redirection connections 110 have been established between the managed platform 108 and the media devices 114 of the media server 112, the control service 104 may manage the redirection connections 110 through mechanisms inherent in the redirection protocols themselves. Accordingly, the management operations performed by the control service 104 may vary from connection 110 to connection 110 based on the protocol mechanisms. In some embodiments, managing the managed platform, including the redirection connections 110, may involve the control service 104 facilitating data input from and/or output to the media devices 114 through the redirection connections 110. Using mechanisms of the redirection protocols, the media devices 114 may send data to and receive data from the managed platform 108, and the managed platform 108 may send data to and receive data from the media devices 114. In some embodiments, the control service 104 may terminate one or all of the redirection connections 110 and/or the data session, regardless of the mechanisms of the redirection protocols.

Figure 2:
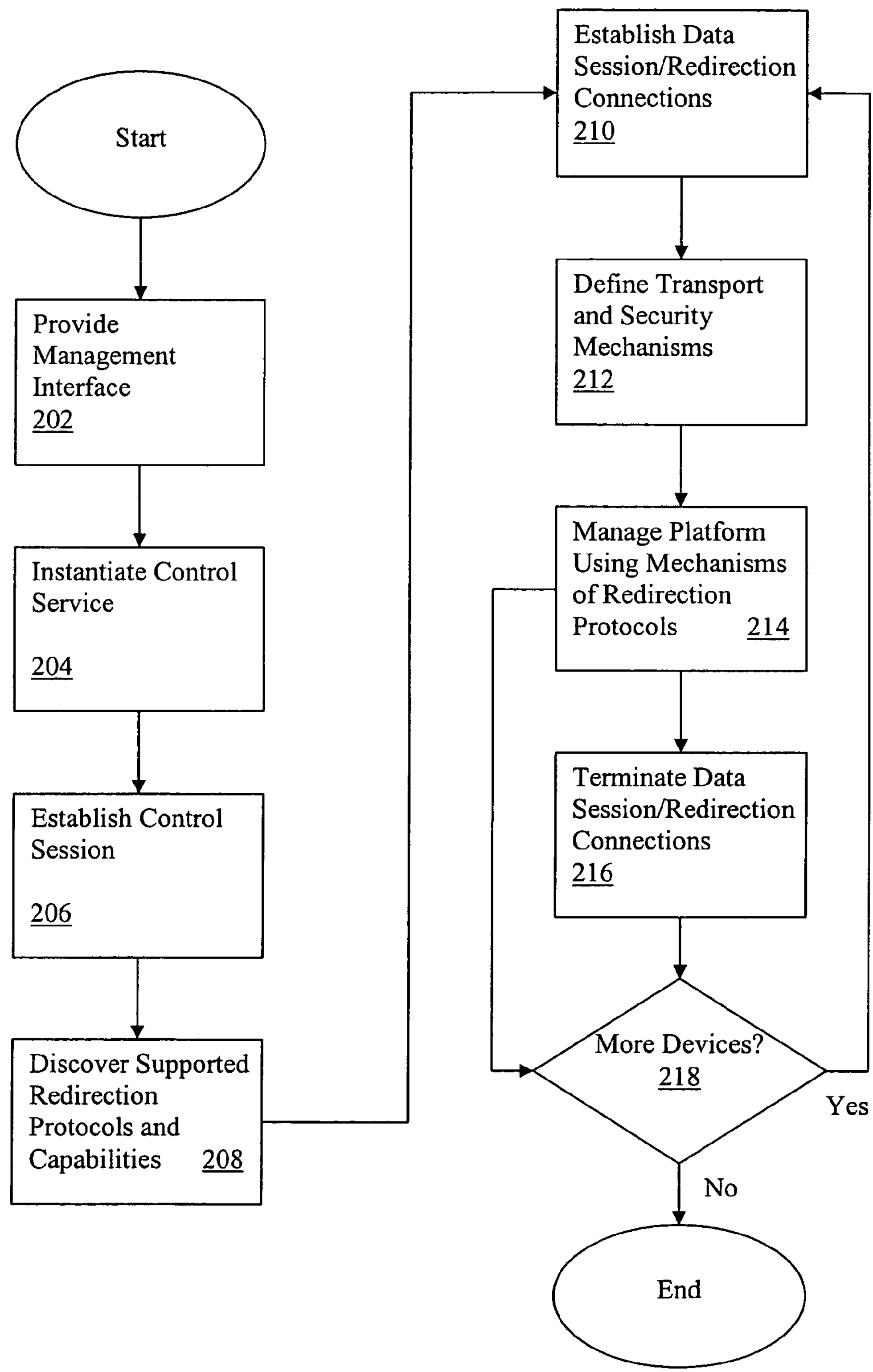
FIG. 2 illustrates a flow chart view of selected operations of the methods of various embodiments of the present invention, to redirect media devices to a remotely disposed platform through a common control console.

FIG. 2 illustrates a flow chart view of selected operations of the methods of various embodiments of the present invention, to manage a remotely disposed platform through a control service. As illustrated, a method of an embodiment may involve a management console providing a user, such as an IT professional, with a management user interface, the interface facilitating the user of the management console in instantiating a control service, blocks 202-204. In various embodiments, the management console may provide a user with a management user interface, such a graphic user interface, block 202, to provide a console user with facilities to instantiate a control service, establish a control session through that control service, an utilize the control service for other operations, such as those described above and below. The management console may then instantiate the control service, block 204, either automatically or in response to user action through the management user interface.

In some embodiments, the method of the embodiment described above may further involve the control service establishing a control session with the remotely disposed platform and discovering redirection protocols and capabilities supported by the remotely disposed platform, blocks 206-208. In various embodiments, once the control service has been instantiated, the control service may establish a control session with a remotely disposed platform, block 206, instantiating a redirection control service on a management controller of the managed platform to serve as the managed platform endpoint of the control session. The control session may allow the control service to remotely manage the platform to establish redirection connections between the redirection control service of the platform and media devices remote from the platform. The control service may next discover redirection protocols and associated capabilities supported by the remotely disposed platform, block 208, through the control session. The redirection protocols supported by the platform may be those of a plurality of media devices of a media server remotely disposed from the platform, the protocols capable of redirecting data of the media devices from the locally coupled media server to a remotely disposed platform.

Upon discovering the redirection protocols and capabilities supported by the remotely disposed platform, the control service may direct the redirection control service of the remotely disposed platform to establish a data session and redirection connections with the media server and media devices of that server based on the supported redirection protocols, may define transport and security mechanisms, may manage the platform and redirection connections using the mechanisms of the redirection protocols, and may terminate one or more redirections connections and/or the data session, blocks 210-216.

More specifically, in various embodiments, the control service may direct the redirection control service of the managed, remotely disposed platform, through the control session, to establish a data session with the media server, and a number of redirection connections with media devices of the server, block 210, if the media devices have associated redirection protocols supported by the platform. In addition to directing the platform to establish the data session and redirection connections, the control service may define transport and security mechanisms for each redirection connection, block 212. The transport and security mechanism defined may depend on the mechanisms of the existing redirection protocols, and may thus vary from redirection connection to redirection connection. Upon establishing the redirection connections, the control service may then manage the platform and the redirection connections through the mechanisms of the redirection protocols, block 214. The protocols may each have different mechanisms, as a different media device vendor may have produced each protocol independently. The mechanisms may allow the control service, for instance, to manage the two-way flow of data between the connected media devices and platform. Further, the control service may terminate one or more redirection connections and/or the data session at any time, irrelevant of the mechanisms of the redirection protocols, block 216.

Thereafter, blocks 210-216 are repeated until all redirection connections for all needed media devices have been accomplished, block 218. Accordingly, a management console may manage a remotely disposed platform through a control service capable of discovering and making use of existing redirection protocols of media devices, remotely disposed from the platform, to redirect the devices to the platform through a number of redirection connections.

Figure 3:
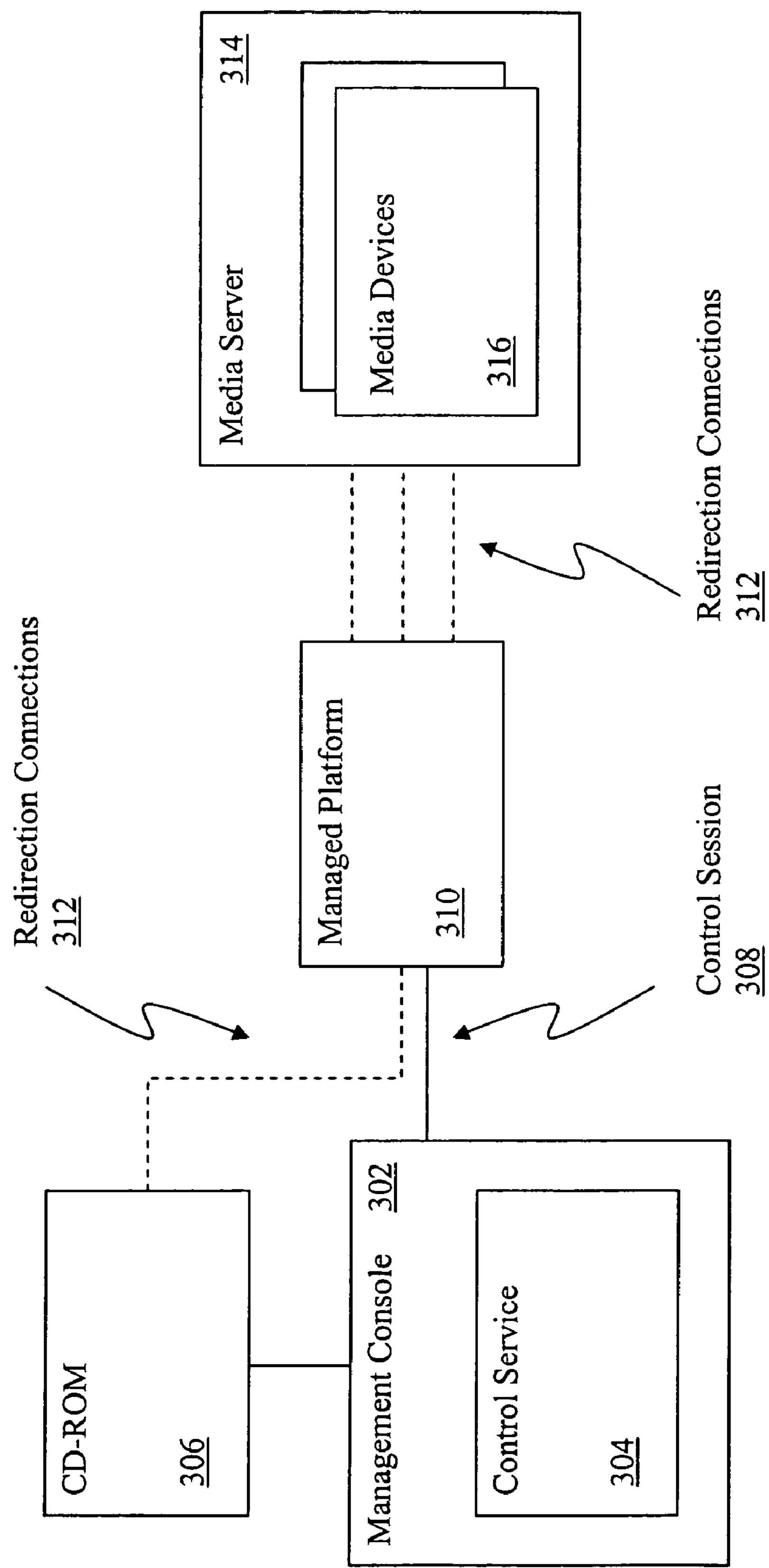
FIG. 3 illustrates a system view of various embodiments of the present invention, including a CD-ROM of the management console to be redirected to a remotely disposed platform.

FIG. 3 illustrates a system view of various embodiments of the present invention, including a CD-ROM of the management console capable of redirection to a remotely disposed platform. As illustrated, a management console 302 may be locally coupled with a CD-ROM 306 and may include a control service 304 capable of establishing a control session 308 between the management console 302 and a redirection control service of the remotely disposed managed platform 310, in some embodiments via a networking fabric (not shown). The control service 304 may further direct the managed platform 310 to establish data sessions with the media server 314 and/or the management console 302, the data sessions including redirections connections 312 between the media devices 316 of server 314 and the platform 310, and/or between the CD-ROM 306 and the platform 310, respectively. The management console 302, control service 304, control session 308, managed platform 310, redirection connections 312, media server 314, and media devices 316 have all been described above in detail in reference to FIGS. 1 and 2.

In various embodiments, CD-ROM 306 may be any sort of CD-ROM known in the art, such as a CD-ReWritable (CD-RW) or a CD-ROM equipped to play Digital Video Discs (DVD). CD-ROM 306 and/or management console 302 may further comprise a redirection protocol for redirecting CD-ROM 306 data from the management console 302 to a remotely disposed platform, such as managed platform 310. The redirection protocol may include a plurality of mechanisms facilitating data transport and security.

As is shown, upon discovering the capabilities and redirection protocols supported by the managed platform, the control service 304 may establish data session and redirection connections 312. If the control service 304 discovers that the managed platform 310 supports the redirection protocol of CD-ROM 306, the control service may direct the managed platform 310 to establish a data session with the management console 302, and then one of the management console 302 and the managed platform 310 may initiate a redirection connection 312. The system initiating the redirection connection 312 may vary depending upon the mechanisms of the CD-ROM 306 redirection protocol. Once a redirection connection 312 is established between the CD-ROM 306 and managed platform 308, the control service 304 may manage the redirection connection 312 utilizing the mechanisms of the redirection protocol, as is described in greater detail above in reference to FIGS. 1 and 2.

Thus, it is contemplated that media devices of the same or different media types may be redirected to the managed platform from one or more media servers.

FIG. 4 illustrates an example computer system suitable for use to practice various embodiments of the present invention. As shown, computing system 400 includes one or more processors 402, and system memory 404. Additionally, computing system 400 includes mass storage devices 406 (such as diskette, hard drive, CD-ROM and so forth), input/output devices 408 (such as keyboard, cursor control and so forth), communication interfaces 410 (such as network interface cards, modems and so forth), and management controller 414 (such as an embedded management controller to manage media devices in a manner transparent to an operating system of the computer system 400). The elements are coupled to each other via system bus 412, which represents one or more buses. In the case of multiple buses, they are bridged by one or more bus bridges (not shown).

Each of these elements performs its conventional functions known in the art. In particular, system memory 404 and mass storage 406 may be employed to store a working copy and a permanent copy of the programming instructions implementing the control services, implementing the redirection control services of managed platforms (such as the above discussed CIM classes), support for the redirection protocols, and/or redirection connections, herein collectively denoted as instructions 422. The various components may be implemented as assembler instructions supported by processor(s) 402 or high level languages, such as C, that can be compiled into such instructions.

The permanent copy of the programming instructions may be placed into permanent storage 406 in the factory, or in the field, through, for example, a distribution medium (not shown), such as a compact disc (CD), or through communication interface 410 (from a distribution server (not shown)).

The constitution of these elements 402-414 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. A method comprising: instantiating on a computing device, a control service to facilitate management of a platform remotely disposed from the computing device, the platform supporting a plurality of redirection protocols redirecting media devices of different types to the platform; establishing by the computing device, a control session with the remotely disposed platform, through the control service; and discovering by the computing device, through the control service and the control session, the supported media device redirection protocols of the remotely disposed platform by sending a query to the remotely disposed platform; determining by the computing device, whether one or more media devices associated with a media server, remotely disposed from the platform, are associated with at least one of the supported media device redirection protocols of the remotely disposed platform; directing by the computing device, through the control service and the control session, the remotely disposed platform to establish a data session with the media server, the data session including a number of redirection connections redirecting the one or more media devices of the media server associated with the at least one of the supported redirection protocol to the platform.

2. The method of claim 1, wherein the computing device and the media server are one and the same.

3. The method of claim 1, further comprising discovering by the computing device, through the control service and the control session, one or more capabilities of the remotely disposed platform associated with the plurality of supported redirection protocols.

4. The method of claim 1, wherein the media devices of different types include at least one media device selected from the group consisting of a CD-ROM, a biometric scanner, a serial port, a scanner, a keyboard, a display, a floppy drive, a mass storage device, and a mouse.

5. The method of claim 1, further comprising terminating by the computing device, through the control service and the control session, at least one redirection connection and the data session.

6. The method of claim 1, further comprising providing a management interface to the computing device to facilitate a user in causing the computing device to perform said instantiating of the control service, said establishing of the control session, said discovering of the supported redirection protocols, said controlling of the remotely disposed platform, and said managing of the remotely disposed platform.

7. The method of claim 1, wherein said managing of the remotely disposed platform comprises managing by the computing device, through said control service and the control session, at least one of the number of redirection connections through mechanisms of at least one of the discovered redirection protocols.

8. The method of claim 1, wherein establishing the control session comprises instantiating, by the control service, a redirection control service from one or more common information model (CIM) classes on the remotely disposed platform, wherein the redirection control service is the remotely disposed platform endpoint of the control session.

9. The method of claim 1, further comprising defining by the computing device, through the control service and the control session, a transport mechanism and a security mechanism for at least one of the number of redirection connections.

10. An apparatus comprising: a mass storage device having stored therein a plurality of programming instructions configured to program one or more processors, wherein the programming instructions upon execution by the one or more processors adapted to enable the apparatus to support a plurality of redirection protocols redirecting a plurality of remotely disposed media devices of different types to the apparatus, respond to a query received from a control service of a remotely disposed management console by forwarding information associated with the plurality of redirection protocols to the control service to enable the control service to discover the supported redirection protocols, and respond to the control service in establishing a data session with a media server that includes one or more redirection connections with one or more remotely disposed media devices associated with the media server if the one or more media devices are associated with at least one of the supported redirection protocols.

11. The apparatus of claim 10, wherein the remotely disposed media devices of different types are devices of a remotely disposed media server.

12. The apparatus of claim 10, wherein the plurality of programming instructions are further adapted to support one or more capabilities associated with the plurality of supported redirection protocols.

13. The apparatus of claim 10, wherein the remotely disposed media devices of different types include at least one media device selected from the group consisting of a CD-ROM, a biometric scanner, a serial port, a scanner, a keyboard, a display, a floppy drive, a mass storage device, and a mouse.

14. The apparatus of claim 10, wherein data communications of at least one of the plurality of redirection connections are facilitated by mechanisms of at least one of the plurality of redirection protocols.

15. The apparatus of claim 10, wherein at least a portion of the plurality of programming instructions comprise one or more common information model (CIM) classes instantiable into a redirection control service of the apparatus capable of said responding to the remotely disposed management console to enable the control service of the management console to discover the supported redirection protocols and to establish the redirection connections.

16. An article of manufacture comprising a mass storage device having a plurality of programming instructions stored therein, the plurality of programming instructions adapted to program an apparatus to enable the apparatus to support a plurality of redirection protocols redirecting a plurality of remotely disposed media devices of different types to apparatus; respond to a query received from a control service of a remotely disposed management console by forwarding information associated with the plurality of redirection protocols to the control service to enable the control service to discover the supported redirection protocols; and respond to the control service in establishing a data session with a media server that includes one or more redirection connections with one or more remotely disposed media devices associated with the media server if the one or more media devices are associated with at least one of the supported redirection protocols.

17. The article of claim 16, wherein the remotely disposed media devices of different types include at least one media device selected from the group consisting of a CD-ROM, a biometric scanner, a serial port, a scanner, a keyboard, a display, a floppy drive, a mass storage device, and a mouse.

18. The article of claim 16, wherein data communications of at least one of the plurality of redirection connections are facilitated by mechanisms of at least one of the plurality of redirection protocols.

19. The article of claim 16, wherein at least a portion of the plurality of programming instructions comprise one or more common information model (CIM) classes instantiable into a redirection control service of the apparatus capable of said responding to the remotely disposed management console to enable the control service of the management console to discover the supported redirection protocols and to establish the redirection connections.

20. A system comprising: a processor; a CD-ROM; and a computing engine operated by the processor and adapted to instantiate on the system, a control service to facilitate management of a platform remotely disposed from the system, platform supporting a plurality of redirection protocols redirecting media devices of different types to the platform; establish a control session with the remotely disposed platform, through the control service; discover, through the control service and control session, the supported media device redirection protocols of the remotely disposed platform by sending a query to the remotely disposed platform; determine whether one or more media devices associated with a media server and the CD-ROM, both remotely disposed from the platform, are associated with at least one of the supported media device redirection protocols of the remotely disposed platform; direct the remotely disposed platform to establish one or more data sessions with a media server and the system, the one or more data sessions each including a number of redirection connections redirecting the media devices of the media server to the platform and redirecting the CD-ROM of the system to the platform if the media devices and the CD-ROM are associated with the at least one of the supported redirection protocols.

21. The system of claim 20, wherein the computing engine is further adapted to discover, through the control service and the control session, one or more capabilities of the remotely disposed platform associated with the plurality of supported redirection protocols.

22. The system of claim 20, wherein the media devices of different types further include at least one media device selected from the group consisting of an additional CD-ROM, a biometric scanner, a serial port, a scanner, a keyboard, a display, a floppy disk, a mass storage device, and a mouse.

23. The system of claim 20, wherein the computing engine is adapted to manage the remotely disposed platform through the control service and the control session, and the managing comprises managing at least one of the number of redirection connections through mechanisms of at least one of the discovered redirection protocols.

24. The system of claim 20, wherein establishing the control session comprises instantiating, by the control service, a redirection control service from one or more common information model (CIM) classes on the remotely disposed platform, wherein the redirection control service is the remotely disposed platform endpoint of the control session.

25. The system of claim 20, wherein the computing engine is further adapted to define, through the control service and control session, a transport mechanism and a security mechanism for at least one of the number of redirection connections.

* * * * *